(12) United States Patent
Maamari et al.

(10) Patent No.: US 10,312,980 B2
(45) Date of Patent: Jun. 4, 2019

(54) METHOD AND APPARATUS FOR MULTIUSER MIMO BEAMFORMING TRAINING

(71) Applicant: Futurewei Technologies, Inc., Plano, TX (US)

(72) Inventors: Diana Maamari, Rolling Meadows, IL (US); Majid Ghanbarinejad, Rolling Meadows, IL (US); George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 68 days.

(21) Appl. No.: 15/345,398

(22) Filed: Nov. 7, 2016

(65) Prior Publication Data

US 2017/0134076 A1    May 11, 2017

Related U.S. Application Data

(60) Provisional application No. 62/252,281, filed on Nov. 6, 2015.

(51) Int. Cl.
*H04B 7/0452*    (2017.01)
*H04L 5/00*    (2006.01)
*H04B 7/06*    (2006.01)
*H04B 7/08*    (2006.01)

(52) U.S. Cl.
CPC ......... *H04B 7/0452* (2013.01); *H04B 7/0617* (2013.01); *H04B 7/0632* (2013.01); *H04B 7/0695* (2013.01); *H04B 7/088* (2013.01); *H04L 5/006* (2013.01)

(58) Field of Classification Search
CPC ........................ H04B 7/0452; H04B 7/0632; H04B 7/0695; H04B 7/088; H04B 7/0617; H04L 5/006
See application file for complete search history.

(56) References Cited

U.S. PATENT DOCUMENTS

| | | | | |
|---|---|---|---|---|
| 8,625,565 | B2 * | 1/2014 | Cordeiro | H04B 7/0617 370/328 |
| 2015/0244432 | A1 * | 8/2015 | Wang | H04B 7/0695 375/267 |
| 2016/0329947 | A1 * | 11/2016 | Jo | H04B 7/0634 |
| 2017/0111099 | A1 * | 4/2017 | Jo | H04B 7/0684 |
| 2017/0126303 | A1 * | 5/2017 | Jo | H04B 7/0684 |
| 2017/0134076 | A1 * | 5/2017 | Maamari | H04B 7/0452 |
| 2018/0020389 | A1 * | 1/2018 | Abdallah | H04W 40/02 |

* cited by examiner

*Primary Examiner* — Curtis A Alia
(74) *Attorney, Agent, or Firm* — David Roe

(57) ABSTRACT

A method for beamforming training is disclosed including SNR values with each of the SNR values associated with one of the antenna identifiers (IDs) in a first frame identifying different radio frequency (RF) chains for a process of beamforming training; receiving and transmitting the first frame bi-directionally between multiple pairs of communicating nodes, wherein each pair of the communicating nodes has at least one initiator node and one responder node; receiving feedback of the SNRs associated with the antenna IDs from two or more responder nodes of the multiple pairs of the communicating nodes to choose an RF chain as favorable transmit antenna for transmission; and determining respective one from the multiple antenna sectors of the multiple antennas for transmission for the responder nodes according to the feedback. A central network controller and a system are also disclosed herein.

17 Claims, 8 Drawing Sheets

| Frame Control | Duration | RA | TA | SSW | SSW Feedback | FCS |
|---|---|---|---|---|---|---|
| 2 | 2 | 6 | 6 | 3 | 3 | 4 |

Octets

FIGURE 12A

| Sector Select | DMG Antenna Select | SNR Report | Poll Required | Reserved |
|---|---|---|---|---|
| 6 | 2 | 8 | 1 | 7 |

Bits

FIGURE 12B

METHOD AND APPARATUS FOR MULTIUSER MIMO BEAMFORMING TRAINING

This patent application claims priority to U.S. Provisional Application No. 62/252,281, filed on Nov. 6, 2015 and entitled "Method and Apparatus for Flexible Multiuser MIMO Beamforming Training" which is hereby incorporated by reference herein as if reproduced in its entirety.

TECHNICAL FIELD

The present invention relates to a method and apparatus for wireless communications, and, in particular embodiments, to a method and apparatus for multiuser MIMO beamforming training.

BACKGROUND

Networks generally comprise a plurality of communicating nodes used to communicate data in process of beamforming training. Millimeter wave (mmWave) communication generally corresponds to wireless communication. Directional communications offer additional gain that compensates for the large pathloss experienced for example in mmWave communications. A procedure known as beamforming in Millimeter-wave (mmWave) communications may be characterized by the use of directional antennas. Multiple-input and multiple-output (MIMO) communications exploit the presence of multiple transmit and/or multiple receive antennas to increase spectral efficiency. In a single-user (SU) MIMO system, multiple independent data streams are communicated between two stations (STAs), while in a multiuser (MU) MIMO system a STA transmits multiple independent data streams to multiple STAs.

SUMMARY

An embodiment method for beamforming training disclosed includes signaling a plurality of signal-to-noise ratio (SNR) values with each of the SNR values associated with one of the antenna identifiers (IDs) in a first frame identifying different radio frequency (RF) chains for a process of beamforming training, the RF chains connecting to multiple physical antenna elements with multiple antenna sectors, wherein each of the multiple antenna sectors is identified with a sector ID; receiving and transmitting the first frame bi-directionally between multiple pairs of communicating nodes, wherein each pair of the communicating nodes has at least one initiator node and one responder node; receiving feedback of the SNRs associated with the antenna IDs from two or more responder nodes of the multiple pairs of the communicating nodes to choose an RF chain as favorable transmit antenna for transmission; and determining respective one from the multiple antenna sectors of the multiple antennas for transmission for the responder nodes according to the feedback.

An embodiment of a central network controller for beamforming training includes a processor; and a non-transitory computer readable storage medium storing programming for execution by the processor, the programming including instructions for: signaling a plurality of signal-to-noise ratio (SNR) values with each of the SNR values associated with one of the antenna identifiers (IDs) in a first frame identifying different radio frequency (RF) chains for a process of beamforming training, the RF chains connecting to multiple physical antenna elements with multiple antenna sectors, wherein each of the multiple antenna sectors is identified with a sector ID; receiving and transmitting the first frame bi-directionally between multiple pairs of communicating nodes, wherein each pair of the communicating nodes has at least one initiator node and one responder node; receiving feedback of the SNRs associated with the antenna IDs from two or more responder nodes of the multiple pairs of the communicating nodes to choose an RF chain as favorable transmit antenna for transmission; and determining respective one from the multiple antenna sectors of the multiple antennas for transmission for the responder nodes according to the feedback.

BRIEF DESCRIPTION OF THE DRAWINGS

For a more complete understanding of the present invention, and the advantages thereof, reference is now made to the following descriptions taken in conjunction with the accompanying drawing, in which:

FIG. 12A illustrates an embodiment of an SSW frame format;

FIG. 12B illustrates an embodiment of a SSW feedback field corresponding to FIG. 12A.

DETAILED DESCRIPTION OF ILLUSTRATIVE EMBODIMENTS

Figure 1A:
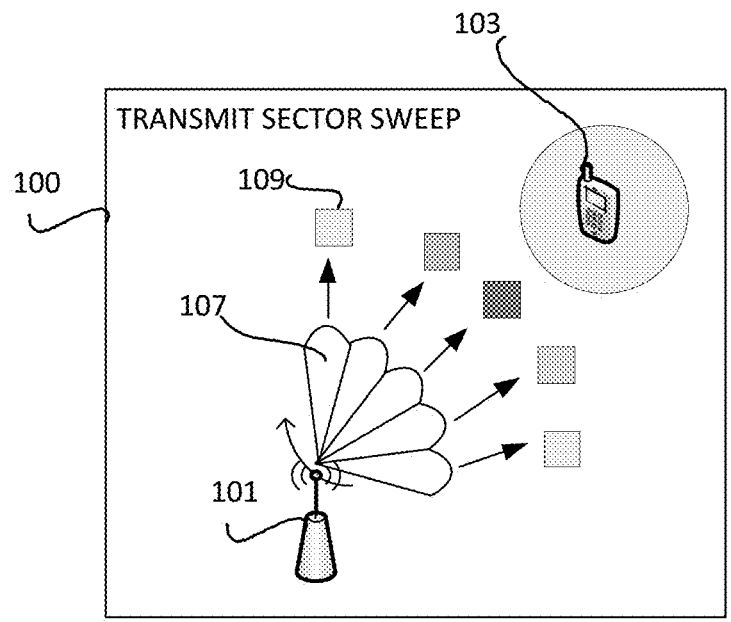
FIG. 1A shows an example for two nodes communicating over antenna sectors.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Some embodiments may be used in conjunction with devices and/or networks operating in accordance with the various embodiments disclosed herein.

A wireless communication to the millimeter waveband may be characterized by the use of highly directional transmission to combat smaller link budget and higher pathloss at mmWave frequencies. Currently, only the transmission of a single data stream, i.e., a single-input and single-output (SISO) system can be found supported in standards of telecommunication. Solutions to MIMO communications are not provided yet, either SU-MIMO or MU-MIMO. However, if multiple antennas e.g. up to four antennas or even more antennas are supported to be multiplexed in a same Physical Layer (PHY) Protocol Data Unit (PPDU), a much higher spectral efficiency can be achieved thereof.

A directional communication scheme that takes advantage of beamforming antenna gain to cope with increased attenuation in a band, beamforming can result in a highly directional signal focus. A concept of "antenna sector" is introduced that discretize the antenna azimuth. Antenna sectors can be implemented either using pre-computed antenna weight vectors (AWVs) for a phased antenna array or equipping a system with multiple directional antenna elements. A sector may focus antenna gain in a certain direction. Communication nodes thus have to agree on an optimal pair of receive and transmit sectors to optimize signal quality and throughput. This process may be referred to as beamforming training. The beamforming training may take advantage of the discretized antenna azimuth that reduces the search space of possible antenna array configurations.

Networks generally comprise a plurality of communicating nodes used to communicate data in the process of beamforming training. For the purpose of clarity, the term communicating node or node is intended to include, but not be limited to, any device capable of sending or receiving data. An example of a communicating node could be a user equipment (UE) such as a cellular telephone, a base station (BS), or a relay-capable stations (STAs) as such a device which are capable of communicating with other devices.

A communicating node may communicate its capabilities through management frames such as association request frames to a central network controller. A central network controller in intended to include, but not limited to, any device capable of sending or handling or receiving data. An example of a central network controller could be a personal basic service set (PBSS) control point (PCP) or an access point (AP). Once the capabilities are known to the PCP/AP, a source STA that intends to establish a link to a destination STA performs relay discovery and relay link setup (RLS) procedures. The procedures include obtaining a list of available relay-capable STAs from the PCP/AP, performing link quality measurements with each relay-capable STA, and exchanging request/response frames between the source STA, the relay STA and the destination STA. Then, the relay STA participates in communications between the source STA and the destination STA in the service periods (SPs) scheduled by the PCP/AP.

A beam training process or a beamforming training process can be performed in two phases. The first phase, known as sector-level sweep (SLS), provides an initial (coarse) antenna weight configuration. The information obtained from SLS is then used in the second phase, the beam refinement protocol (BRP), to refine the selected coarse beams.

FIG. 1A shows an example for two nodes communicating over antenna sectors. Specifically, an example for a transmit sector sweep (TXSS) between antenna 101 and UE 103 is shown by FIG. 1A. Multiple frames 109 are transmitted on various sectors 107. The transmitter antenna 101 transmits the multiple frames 109 to the UE 103 for the UE to select which antenna sector for transmission.

Figure 1B:
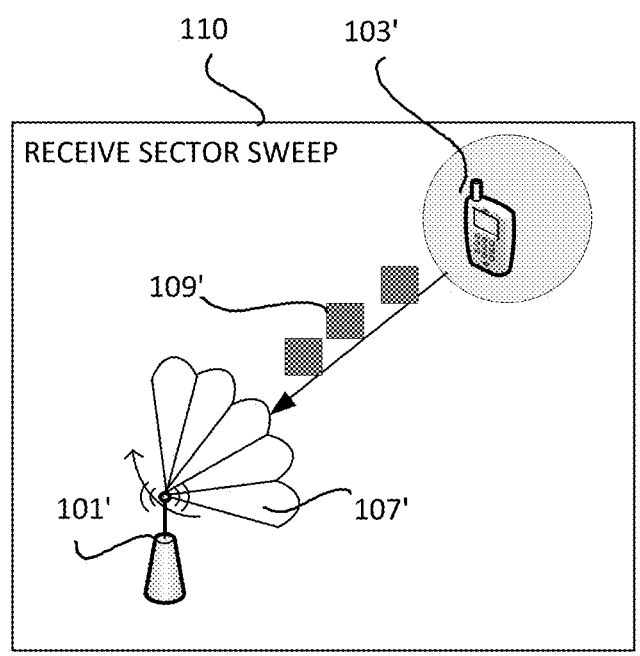
FIG. 1B shows another example for two nodes communicating over antenna sectors.

FIG. 1B shows another example for two nodes communicating over antenna sectors. Specifically, an example for a receive sector sweep (RXSS) between the two nodes of FIG. 1A is shown by FIG. 1B. During a RXSS, transmission on the same sector allows to test for the optimum receive sector at the pairing node. FIG. 1B shows four sweep combinations for sector level sweep. Transmit sector sweeps and receive sector sweeps at both nodes of the antenna 101, 101' and the UE 103, 103'. The selected sector to transmit the frames may offer the optimum link quality in the absence of blocking obstacles.

A personal basic service set coordination point (PCP) or the access point (AP) may have a sub-connected transceiver architecture, i.e., where each radio frequency (RF) chain is connected to a separate set of antenna elements, known as sub-array of array. Since an RF chain allows the transmission of only one independent data stream at one time, multiple STAs cannot be served by the same transmit RF chain simultaneously. When the PCP/AP is performing MU-MIMO beamforming training with multiple downlink STAs, and more than one STA feed backs the same PCP/AP antenna identifier (ID) identifying the corresponding RF chain as the favorable downlink transmit antenna for transmission, problems would thus be raised. For example, the PCP/AP would have to repeat the process of SLS until the responding STAs feed-back a different antenna ID. Additionally, overhead and time delay would be encountered.

Various embodiments provide solutions suitable for MU-MIMO and SU-MIMO operations a directional communication scheme, which may be illustrated for example in a millimeter waveband communication system.

An embodiment method for beamforming training includes signaling a plurality of signal-to-noise ratio (SNR) values with each of the SNR values associated with one of the antenna identifiers (IDs) in a first frame identifying different radio frequency (RF) chains for a process of beamforming training, the RF chains connecting to multiple physical antenna elements with multiple antenna sectors, wherein each of the multiple antenna sectors is identified with a sector ID; receiving and transmitting the first frame bi-directionally between multiple pairs of communicating nodes, wherein each pair of the communicating nodes has at least one initiator node and one responder node; receiving feedback of the SNRs associated with the antenna IDs from two or more responder nodes of the multiple pairs of the communicating nodes to choose an RF chain as favorable transmit antenna for transmission; and determining respective one from the multiple antenna sectors of the multiple antennas for transmission for the responder nodes according to the feedback.

Another embodiment of the method may further include keeping receive state for each responder node till all responder nodes have performed the feedback.

Another embodiment of the method may further include selecting a number of antennas as transmit antennas for the responder nodes, signaling the first frame from the number of antennas respectively; and transmitting the first frame a number of times equal to the maximum number of the selected transmit antennas.

Another embodiment of the method may further include that the antenna ID is encoded in a field of the first frame being allocated for the antenna sector and the field is encoded as more than 2 bits.

Another embodiment of the method may further include that the frame is a sector sweep (SSW) frame, wherein the SSW frame further comprises a plurality of signal-to-interference-plus-noise ratio (SINR) values with each of the SINR values associated with one of the antenna IDs.

Another embodiment of the method may further include transmitting pairing frames to assign antennas with all the feedback having been received from the two or more responders.

Another embodiment of the method may further include transmitting a single beam refinement protocol (BRP) packet for the process of beamforming training from different antennas to all responder nodes; and appending training fields with the BRP packet.

Another embodiment of the method may further include that when the training fields being appended with the BRP packet; changing directions of associated antenna sequentially so that the responder node in the pair detects different beams sent from the associated antenna.

Another embodiment of the method may further include transmitting the training fields from an antenna port while other antenna ports are silenced.

Another embodiment of the method may further include that the training fields appended to the BRP frames are silenced while other training fields are transmitted.

Another embodiment of the method may further include that the BRP frames from different antennas are transmitted with a delay.

Another embodiment of the method may further include pairing a first antenna with a first responder node according to the feedback from the first responder node, information gained from the first pairing is configured to be used for a second antenna with a second responder node; repeating the process of the first responder node and the second responder node for the next responder nodes.

Another embodiment of the method may further include assigning different antenna and antenna sector for each responder node with a multicast frame, wherein the multicast frame further comprises a descriptor set mapping the antenna sectors to the responder node, wherein the descriptor set maps different training fields to different antennas for different communicating node.

Another embodiment of the method may further include transmitting a packet containing periods of no transmission from one or more antennas in a packet-based communication network.

Any one of above embodiments may be combined with any one or more of the other embodiments to provide solutions with various advantages.

According to an exemplary embodiment, a first frame is exchanged between two or more communicating nodes or STAs, which may be called an initiator and a responder for each pair of nodes. A link between the initiator and the responder may be trained by a process of beamforming. The first frame is sent to the initiator, a plurality of antenna IDs are included for the initiator to choose transmit antenna. A feedback frame may be sent by the initiator in following process. Optionally an acknowledgment (ACK) frame may be sent by the responder. A second frame is sent to the responder, the plurality of antenna IDs are included for the responder to choose transmit antenna. A feedback frame may be sent by the responder in following process. Optionally an acknowledgment (ACK) frame may be sent by the initiator. A sector ID may also be included in the first and/or second frame. Multiple frames including the first frame and the second frame may be sent to the communicating nodes or STAs. The multiple frames may be sent sequentially or in parallel. The frames may be sent to all communicating nodes at the same time or separately.

Figure 2:
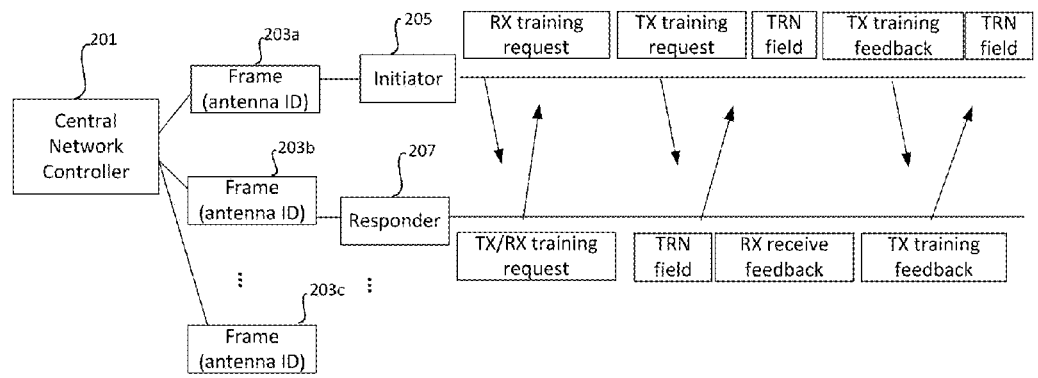
FIG. 2 shows an exemplary embodiment for beamforming training in millimeter wave band communication.

FIG. 2 shows an exemplary embodiment for beamforming training in millimeter wave band communication. A central network controller 201, which may be a PCP or an AP, may do sector training to all stations at the same time or separately. The central network controller 201 may convey beam training parameters between two nodes, during dynamic or pseudo static channel allocation. The central network controller may learn about the pending beam training and integrate the information into scheduling process. A plurality of antenna IDs corresponding to different antenna sectors are carried in a training frame 203a, 203b, 203c from the central network controller 201 to various communicating nodes 205, 207. During the beamforming training process, requests and feedback may be exchanged between a pair of nodes such as the initiator and the responder. The requests and feedbacks may be carried by exchanging frames. TX is for transmitting, and RX is for receiving. TRN is for training. A TRN field may be carried along in the exchanging frames.

The initiator 205 may send the training frames 203a from different antennas. Each frame 203a may contain multiple antenna IDs identifying different radio frequency (RF) chains for a process of beamforming training, the RF chains connecting to multiple antenna sectors of multiple antennas. The antenna sectors may be represented by multiple antenna sector IDs, and the antenna sector IDs may be contain together with the multiple antenna IDs in the frames. The frames are repeated a number of times equal to the maximum number of selected receive antennas of all nodes.

Each receive node is preferably kept in receive state and may not change its receive antenna configuration for a time corresponding to the value of the last Negotiated Total Number of Sectors field transmitted by the initiator multiplied by the time to transmit a single SSW frame, optionally plus appropriate inter-frame spaces (IFSs). After this time, the responder may switch to another antenna.

For direct beam training initialization, a station or a node 201, 205, 207 that has seized the channel may initiate the beamforming process with a transmit sector seep to a responder 207.

An initiator 205 may inquire a number of receive antenna sectors at the responder 207 via the PCP 201 or higher-level protocols, then an ACK exchange is used to request a receive sector sweep. Following that both nodes may start the training after the ACK frame is transmitted.

When corresponding allocation of antenna is decided, the central network controller 201 may include the beam training parameters into one or more frames sent to both stations including the allocation.

Figure 3A:
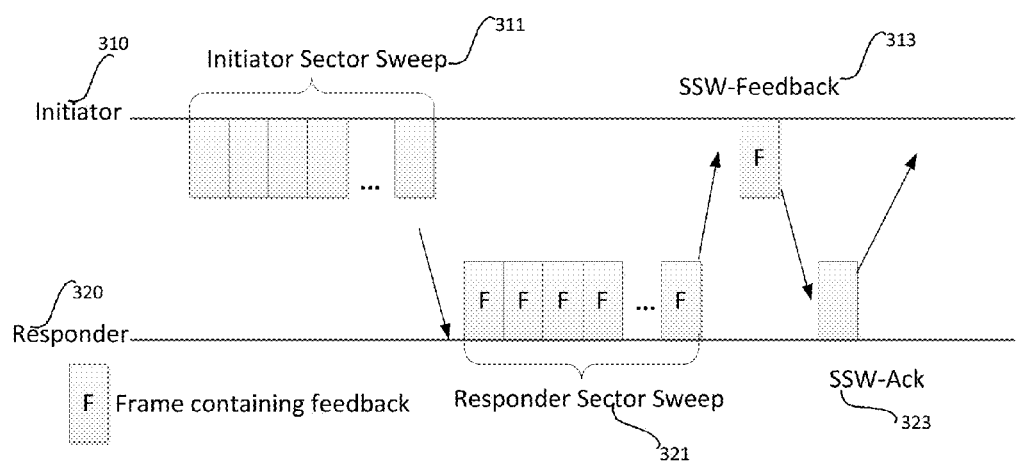
FIG. 3A shows an example process for a sector-level sweep (SLS)

FIG. 3A shows an example process for a sector-level sweep (SLS). The SLS phase may be listed as a first phase in the beamforming training process.

In the SLS phase, a series of frames known as sector sweep (SSW) frames may be exchanged between two STAs called the initiator 310 and the responder 320. The SLS may consist of an initiator sector sweep (ISS) 311, during which the link from the initiator to the responder is trained, and a responder sector sweep (RSS) 321, during which the link from the responder 320 to the initiator 310 is trained, followed by an SSW feedback (SSW-Feedback) frame sent by the initiator and possibly an SSW acknowledgment (SSW-ACK) frame sent by the responder 320.

Each sector sweep (ISS or RSS) 311, 321 may include transmit sector sweep (TXSS) and/or receiver sector sweep (RXSS). In TXSS, SSW frames are transmitted on different sectors while the receiver listens to the medium with an omnidirectional or quasi-omnidirectional (q-omni) antenna pattern. In RXSS, several SSW frames are transmitted on the same sector, normally the best sector selected during the preceding TXSS, while the receiver listens through different receive antenna patterns for receiving each frame. While TXSS allows the transmitting STA to find the optimum transmit sector, RXSS is used to allow the peer STA to find an optimum receive sector. An optimum transmit sector may also be called a favorable transmit sector which may have stronger directionality among a bunch of transmit sectors to optimize the transmissions on phased antenna arrays.

The ISS may be either TXSS or RXSS. In TXSS, the initiator sends SSW frames from different antennas. Each SSW frame contains an antenna ID and a sector ID from which the SSW frame is sent. The SSW frames are repeated a number of times equal to the maximum number of selected receive antennas of all STAs.

Each receive STA should be in receive state and should not change its receive antenna configuration for a time corresponding to the value of the last Negotiated Total Number of Sectors field transmitted by the initiator multiplied by the time to transmit a single SSW frame, plus appropriate inter-frame spaces (IFSs). After this time, the responder may switch to another antenna.

STAs are triggered to perform their RSS. During RSS, each responder transmits SSW frames which contain feedback of antenna IDs to the initiator to inform the initiator of the favorable antenna for downlink transmission.

Figure 3B:
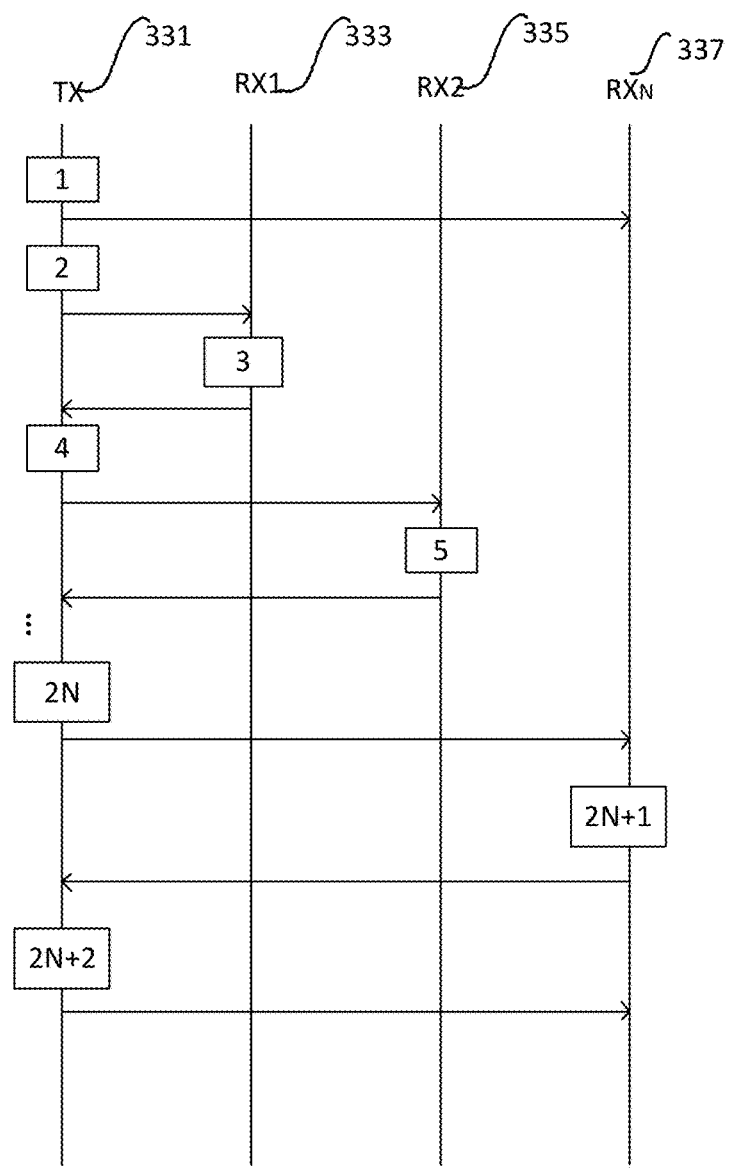
FIG. 3B shows another example process for the sector-level sweep (SLS)

FIG. 3B shows another example process for the sector-level sweep (SLS). TX 331, $RX_2$ 333, $RX_2$ 335, $RX_N$ 337, etc. represent various communicating nodes. The process may be described with the following steps. An Enhanced DMG (EDMG) Antenna Feedback Element is described in the example.

Box 1 of FIG. 3B shows a TX 331 that transmits one or more beamforming training frames to train its own antennas and sectors. Two or more antenna IDs are included in the training frames. Optionally multiple antenna sector IDs and corresponding SNRs are included in the training frames.

Box 2 of FIG. 3B shows a TX 331 that can also transmit a trigger frame to RX1 333 to trigger it to transmit its feedback for either all or some selected TX antennas.

Box 3 of FIG. 3B shows a RX1 333 that transmits one or more beamforming training frames with EDMG Antenna Feedback element which may include the two or more antenna IDs, sector IDs and corresponding SNRs.

Box 4 of FIG. 3B shows a TX 331 that may transmit a trigger frame to RX1 333 to trigger it to transmit its feedback for either all or some selected TX antennas.

Box 5 of FIG. 3B shows a RX2 335 that transmits one or more beamforming training frames with EDMG Antenna Feedback element which includes the antenna IDs, sector IDs and corresponding SNRs.

Box 2N of FIG. 3B shows a TX 331 that transmits a trigger frame to $RX_N$ 337 to trigger it to transmit its feedback for either all or some selected TX antennas.

Box 2N+1 of FIG. 3B shows a RX2 335 that transmits one or more beamforming training frames with EDMG Antenna Feedback element which includes the antenna IDs, sector IDs and corresponding SNRs.

Box (2N+2) of FIG. 3B shows a TX 331 that, having received all necessary feedback, the TX transmits pairing frames to assign (to pair) its antennas with the antennas of the different receivers.

Figure 4:
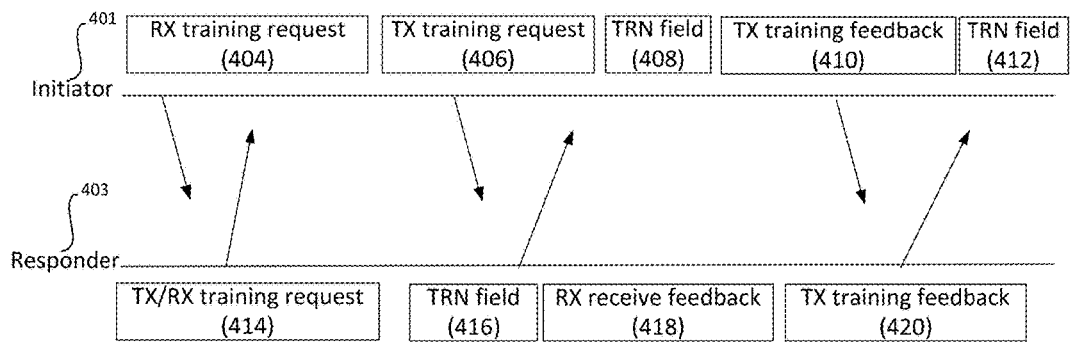
FIG. 4 shows a process for a beam refinement protocol (BRP)

FIG. 4 shows a process for a beam refinement protocol (BRP). The BRP process may be referred as a second phase in the beamforming training process.

In the embodiment shown by FIG. 4, a RX training request 404 is sent by the initiator 401 to the responder 403. The responder 403 transmits a TX/RX training request 414 to the initiator 401. The TX training request 406 is sent by the initiator 401 to the responder 403. The responder 403 transmits a training filed (TRN) 416 to the initiator 401. The initiator 401 sends the TRN field 408 to the responder 403. A RX receive feedback 418 is received by the responder 403 from the initiator 401. A TX training feedback 410 is received by the initiator 401 from the responder 403. A training feedback 420 is sent by the responder 403 to the initiator 401.

During the BRP phase, the antenna sectors that were found in the first phase are refined; therefore, the BRP phase relies on the SLS phase. BRP allows the STAs to evaluate the set of directional patterns in an attempt to provide the best known directional antenna configuration. A BRP-TX frame allows different antenna configurations, also known as antenna weight vectors (AWVs), to be tested out throughout the same frame, i.e., the beam directions being trained are sequentially changed during training (TRN) subfields appended to BRP-TX frames in order to allow the receiver to detect the different beams. A BRP-RX frame is used to train the receiving STA. The number of TRN subfields appended to the BRP packet is negotiated in the BRP setup phase. For example, if the responder 403 is requesting beam refinement, it uses the subfield L-RX within the BRP Request field to signal the number of TRN-R fields that the initiator 401 has to append.

During BRP transactions, request and response frames are transmitted for beam refinement. In this embodiment, the PCP/AP transmits a single-user BRP packet with TRN fields appended where the TRN fields may be transmitted from different antennas. The single-user BRP packet includes a descriptor set within the preamble mapping the different TRN fields to the different antennas for the different STAs. STAs receiving the preamble know which TRN field is assigned to them.

The mapping of the TRN fields is performed in such a way that if the TRN field is transmitted from an antenna port, the other antenna ports are silenced.

Using the same BRP packet and after the PCP/AP has received the L-RX from the devices requesting the beam refinement during the BRP setup phase, the PCP/AP will append TRN-R fields and transmit these fields from different antennas to cover multiple devices. The TRN-R fields are transmitted from different antennas.

For the case of BRP-RX packets, the TRN-R fields corresponding to the same antenna ID is transmitted with the same AWV for the same antenna ID. Each antenna has its own AWV. For the case of BRP-TX packets, the TRN-T is transmitted with different AWVs for the same antenna IDs.

Figure 5:
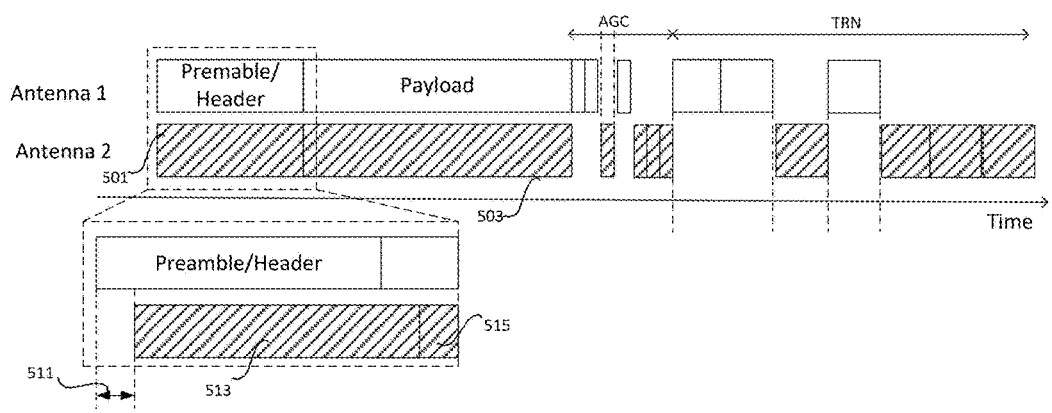
FIG. 5 shows another example process for a beam refinement protocol (BRP)

FIG. 5 shows another example process for a beam refinement protocol (BRP).

The frames from different antennas (antenna 1, antenna 2) are transmitted with a delay 511 to avoid unintentional beamforming. The delay is shown as Cyclic Delay Diversity (CDD) 511. A frame comprises a preamble header (501, 513), a payload (503, 515), may also comprise Automatic Gain Control (AGC), TRN etc.

During the process for the beam refinement, some antennas transmission are silenced while some antennas transmission are going on. The pattern of the silencing of some antennas may be the same as the pattern of the transmission of the TRN fields and AGC in the process.

Various embodiments described above may be combined with various embodiments described below, either respectively or collectively.

An example table is provided below for feedback information by a communicating node.

| FILED | SUBFIELDS | MEANING |
|---|---|---|
| Element ID | | Element's Identification |
| Length | | Element's length |
| Sector ID | Sector ID1 | Sector identification for SNR1 and antenna being measured |
| | Sector ID2 | Sector identification for SNR2 and antenna being measured |
| | ... | |
| | Sector IDn | Sector identification for SNRn and antenna being measured |
| Antenna ID | Antenna ID1 | Sector identification for SNR1 being obtained |
| | Antenna ID2 | Sector identification for SNR2 being obtained |
| | ... | |
| | Antenna IDn | Sector identification for SNRn being obtained |
| SNR | SNR1 | SNR measured at the first sector |
| | SNR2 | SNR measured at the second sector |
| | ... | |
| | SNRn | SNR measured at the Nth sector |

An embodiment provides suitable multiuser MIMO signaling to use when multiple devices favor transmission from the same antenna in the SLS phase. More precisely, an embodiment provides a SSW frame format that supports the multiuser MIMO transmission.

In an embodiment, the SSW Feedback field within the SSW frame transmitted during RSS contains an element, referred to herein as an Enhanced DMG (EDMG) Antenna Feedback Element. Specifically, a SSW Feedback field format within an SSW frame when SSW is not transmitted as part of an ISS. This Element includes an Element ID, Length, a list of the EDMG Antenna Select ID and Sector Select ID in the immediately preceding ISS, for which the responders have performed measurements over. The EDMG Antenna Feedback Element also includes a list of Signal-to-Noise (SNR) ratios corresponding to the listed sectors contained in the Element. In an additional embodiment, the list of antenna IDs with the corresponding SNRs are signaled from the highest SNR values to the lowest.

After the RSS has been executed from all the responders and with this additional signaling, the PCP/AP assigns the antennas to the STAs. The assignment of the antennas is implementation-dependent; for example, it can depend on maximizing the sum throughput of all the STAs.

In another embodiment, the PCP/AP can poll (individually or via a multicast) each receive STA for a specific antenna and sector. The PCP/AP can assign the different antennas (RF chains) to the different STAs. A descriptor set mapping the assigned antennas and sectors to the receive STA is included in the multicast frame. The STAs being polled or has received the multicast frame reply with the requested SNR for the corresponding antenna and sector which were assigned by the PCP/AP. The PCP/AP uses the information to pair its antennas with the receive STAs. After pairing the first antenna with the first receive STA, the PCP/AP can use the information gained (channel gains) from the first pairing to pair the second STA using Successive Interference Cancellation. Then a similar method can be utilized to pair the third STA. Such a mechanism can be executed until the last antenna and STA is considered. In case a multicast frame was used, the PCP/AP can transmit this frame omni-directionally. If the PCP/AP chooses to poll STAs using a dedicated poll frame, this frame can be transmitted directionally in multiple directions, each time to a different direction to cover all spatial directions.

Figure 6:
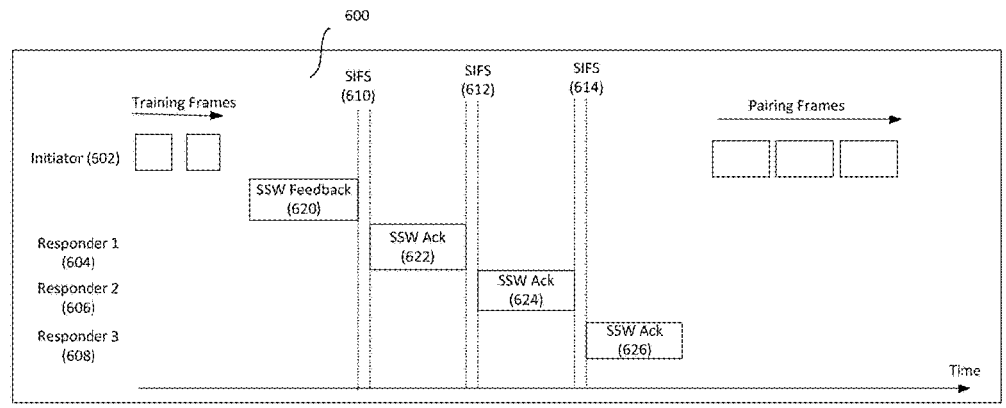
FIG. 6 illustrates an exemplary embodiment for transmission of SSW ACK frames during beamforming training process.

FIG. 6 illustrates an exemplary embodiment for transmission of SSW ACK frames during beamforming training process.

After RSS and during sector sweep feedback, the initiator 602 transmits a sector sweep feedback (SSW-Feedback) frame. Within this frame a bit may be set within the embodiment SSW Feedback field to indicate whether the transmission is an SU or an MU transmission. In the case that the transmission is a MU transmission, the responders 604, 606, 608 may wait for a SSW Feedback frame with a format that contains a descriptor set mapping the antenna IDs and sector IDs to the corresponding STAs. This SSW-Feedback frame is transmitted by the initiator after all the responders have performed the RSS. SSW ACK frames will then follow one by one from the corresponding STAs separated by a short inter-frame space (SIFS) as shown in FIG. 6, which illustrates SSW Feedback and SSW ACK frames for one initiator and three responders. The order in which responders send their SSW ACK frames follows the order of corresponding order in the EDMG Antenna Feedback element.

More embodiments of apparatuses are provided below which can be applied to carry out any one or more embodiments disclosed above to provide various solutions.

An embodiment of a central network controller for beamforming training includes a processor; and a non-transitory computer readable storage medium storing programming for execution by the processor, the programming including instructions for: signaling a plurality of signal-to-noise ratio (SNR) values with each of the SNR values associated with one of the antenna identifiers (IDs) in a first frame identifying different radio frequency (RF) chains for a process of beamforming training, the RF chains connecting to multiple physical antenna elements with multiple antenna sectors, wherein each of the multiple antenna sectors is identified with a sector ID; receiving and transmitting the first frame bi-directionally between multiple pairs of communicating nodes, wherein each pair of the communicating nodes has at least one initiator node and one responder node; receiving feedback of the SNRs associated with the antenna IDs from two or more responder nodes of the multiple pairs of the communicating nodes to choose an RF chain as favorable transmit antenna for transmission; and determining respective one from the multiple antenna sectors of the multiple antennas for transmission for the responder nodes according to the feedback.

Optionally the central network controller may be a PCP or an AP or the like.

Another embodiment of the central network controller may further include the programming instructions for keeping receive state for each responder node till all responder nodes have performed the feedback.

Another embodiment of the central network controller may further include the programming instructions for selecting a number of antennas as transmit antennas for the responder nodes, signaling the first frame from the number of antennas respectively; and transmitting the first frame a number of times equal to the maximum number of the selected transmit antennas.

Another embodiment of the central network controller may further include the programming instructions for wherein the frame is a sector sweep (SSW) frame, wherein the SSW frame further comprises a plurality of signal-to-interference-plus-noise ratio (SINR) values with each of the SINR values associated with one of the antenna IDs.

Another embodiment of the central network controller may further include the programming instructions for transmitting a single beam refinement protocol (BRP) packet for the process of beamforming training from different antennas to all responder nodes; and appending training fields with the BRP packet.

Another embodiment of the central network controller may further include the programming instructions for transmitting the training fields from an antenna port while other antenna ports are silenced.

Any one of above embodiments may be combined with any one or more of the other embodiments to provide solutions with various advantages.

Figure 7:
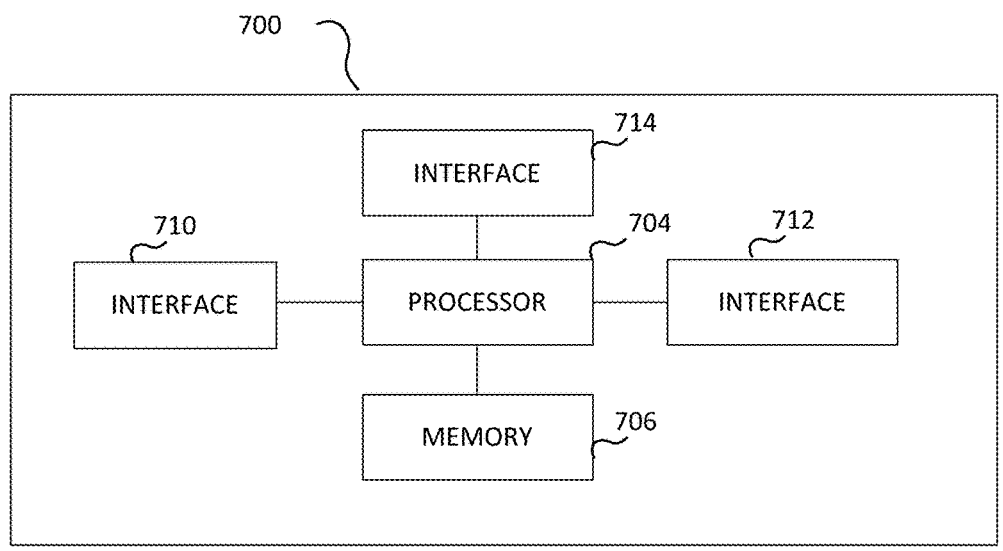
FIG. 7 illustrates an embodiment block diagram of a processing system 700 for performing methods as being described.

FIG. 7 illustrates an embodiment block diagram of a processing system 700 for performing methods as being described. The processing system may be installed in a host device. As shown, the processing system 700 includes a processor 704, a memory 706, and interfaces 710-714, which may (or may not) be arranged as shown in the figure. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in the figure, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smart watch, etc.), or any other device adapted to access a telecommunications network.

In some embodiments, one or more of the interfaces 710, 712, 714 connects the processing system 700 to a transceiver adapted to transmit and receive signaling over the telecommunications network.

Figure 8:
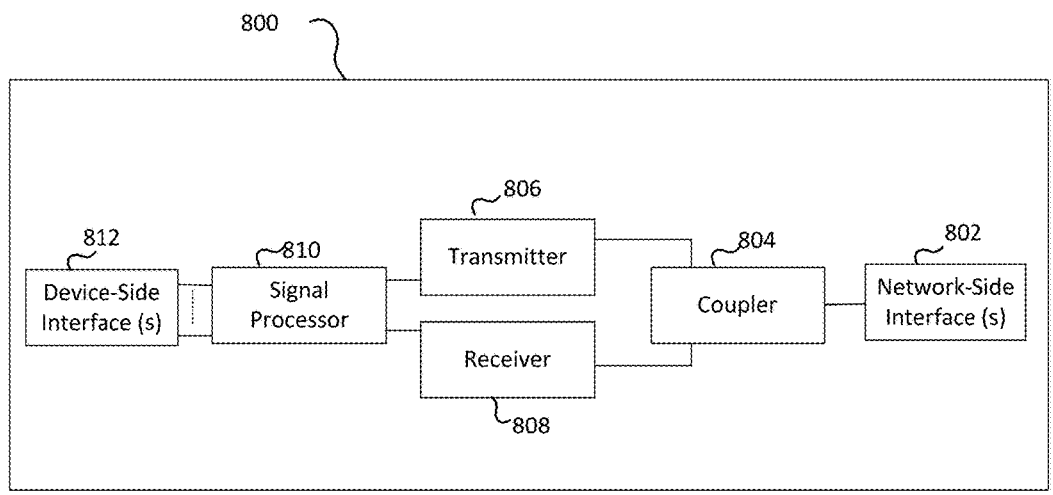
FIG. 8 illustrates an embodiment of a block diagram of a transceiver 800 adapted to transmit and receive signaling over a telecommunications network.

FIG. 8 illustrates an embodiment of a block diagram of a transceiver 800 adapted to transmit and receive signaling over a telecommunications network. The transceiver 800 may be installed in a host device. As shown, the transceiver 800 includes a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 600, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 9:
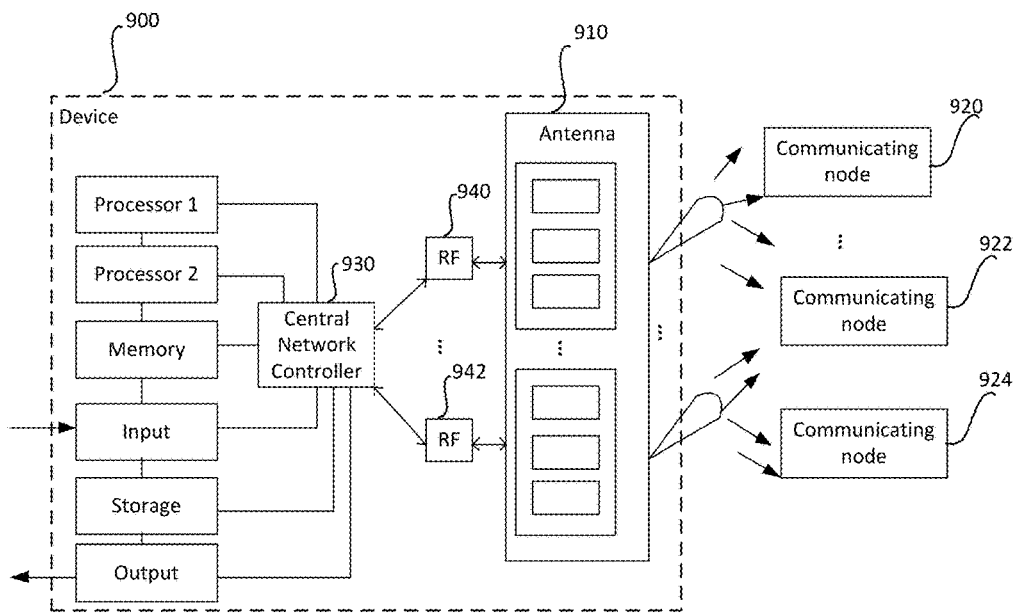
FIG. 9 illustrates an embodiment schematic block diagram of a millimeter communication system.

FIG. 9 illustrates an embodiment schematic block diagram of a millimeter communication system. Any embodiments as disclosed above are demonstrated embodiments being applied or combined in the system.

The system includes device 900, which may further include a central network controller 930, antenna 910. The system may additionally include multiple communicating nodes. The device 900 may communicate with the other devices via one or more wireless communication links over beams formed by the antenna 910. Antennas 910 may be configured for transmitting and/or receiving wireless communication signals, blocks, frames, transmission streams, packets, messages and/or data. Antennas 910 may implement transmit and receive functionalities using separate transmit and receive antenna elements. Antennas 910 may implement transmit and receive functionalities using common and/or integrated transmit/receive elements. Antennas 910 may include an antenna array configured for generating one or more directional beams, for example, for communicating over one or more beamformed links, e.g., as described below. Antennas 910 may include a phased array antenna, an omni-directional antenna, a single element antenna, a multiple element antenna, a set of switched beam antennas, and/or the like.

The communicating nodes 920, 922, 924 may include, for example, a PC, a desktop computer, a mobile computer, a laptop computer, a notebook computer, a tablet computer, a server computer, a handheld computer, a handheld device, a consumer device, a vehicular device, a non-vehicular device, a mobile or portable device, a non-mobile or non-portable device, a mobile phone, a cellular telephone etc.

The device 900 may also include, for example, one or more of processors, an input unit, an output unit, a memory unit, and a storage unit.

The device 900, and/or the communicating nodes 920, 922, 924 may perform the functionality of mmWave STAs. The device may include a wireless beamformed link with other devices. The wireless communication link may include a wireless gigabit (WiGig) link, or a wireless beamformed link over the 60 GHZ frequency band.

The Antenna 910 may include a plurality of antenna elements or antenna arrays, which may be configured, for example, for creating a highly directional antenna pattern. The plurality of antenna elements may be placed, for example, in an array, e.g., a two-dimensional array, of a predefined geometry. The plurality of antenna elements may be configured to form one or more highly directive antenna patterns or beams, which may be steered by setting appropriate signal phases at antenna elements and/or by baseband processing.

The central network controller 930 may have a sub-connected transceiver architecture, i.e., where each radio frequency (RF) chain 940, 942 is connected to a separate set of antenna elements 910, known as sub-array of array. When the central network controller 930 performs MU-MIMO beamforming training with multiple downlink communicating nodes 920, 922, 924. The communicating nodes 920, 922, 924 feed back antenna identifier (ID) identifying the RF chain as the optimum or favorable downlink transmit antenna for transmission.

Figure 10:
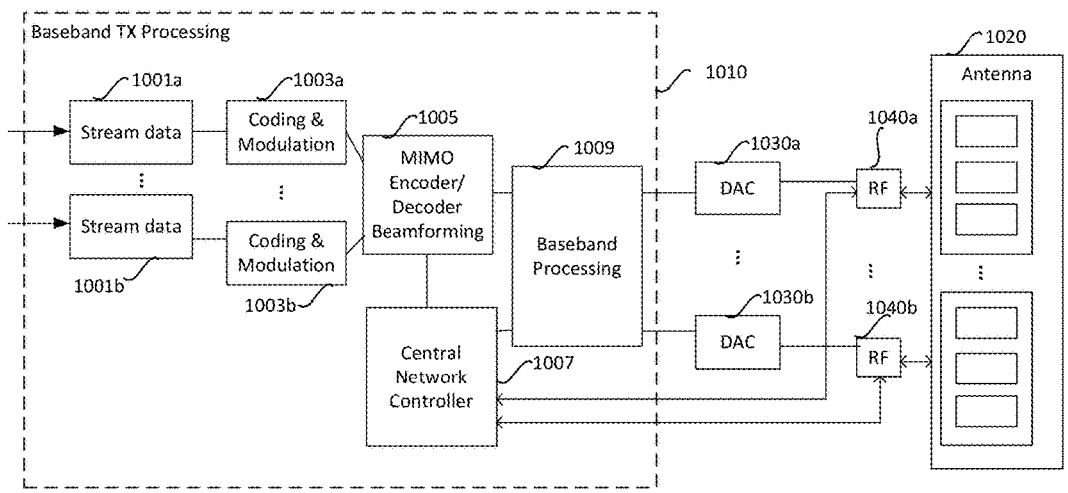
FIG. 10 illustrates a diagram of an embodiment beamforming training in a communication system.

FIG. 10 illustrates a diagram of an embodiment beamforming training in a communication system.

A baseband (BB) TX process unit 1010 is coupled to a plurality of antenna modules 1020. A first data stream 1001a communicates with a first user and a second data stream communicates with a second user. The system may further be configured to communicate a MU-MIMO communication with any other number of users. The BB processing unit 1010 may include a plurality of coding and modulation unit to process the data streams 1001a, 1001b. a MIMO encoder/decoder beamforming unit 1005 is additionally provided to apply fine beamforming processing to the signals processed by modules as described above. A central network controller 1007 is configured to control the BB beamforming applied by MIMO encoder/decoder unit 1005 and the beamform through a plurality of RF chains 1040a, 1040b etc, which may be applied by antenna 1020. For example, the central network controller may control beamform weights applied to the MIMO transmission. A plurality of Digital-to-Analog Converters (DACs) 1030a, 1030b etc. may also be provided for each RF chains 1040a, 1040b.

An example of the central network controller is PBSS which is involved in mmWave communications. One of participating nodes as where the stream data is for service may take a role of the PCP. This PCP acts like an AP, announcing the network and organizing medium access. This centralized approach allows the directional network and schedule announcement process to be used for such as wireless storage and peripherals or wireless display usage etc. Any embodiments as disclosed above are demonstrated embodiments being applied or combined in the system.

An embodiment system for beamforming training includes a baseband (BB) process unit being configured to couple to a plurality of antenna modules, and a central network controller being configured to apply beamforming weights for assigning the plurality of antenna modules for transmissions with the BB, and the central network controller is further configured to include a processor; and a non-transitory computer readable storage medium storing programming for execution by the processor, the programming including instructions for: signaling a plurality of signal-to-noise ratio (SNR) values with each of the SNR values associated with one of the antenna identifiers (IDs) in a first frame identifying different radio frequency (RF) chains for a process of beamforming training, the RF chains connecting to multiple physical antenna elements with multiple antenna sectors, wherein each of the multiple antenna sectors is identified with a sector ID; receiving and transmitting the first frame bi-directionally between multiple pairs of communicating nodes, wherein each pair of the communicating nodes has at least one initiator node and one responder node; receiving feedback of the SNRs associated with the antenna IDs from two or more responder nodes of the multiple pairs of the communicating nodes to choose an RF chain as favorable transmit antenna for transmission; and determining respective one from the multiple antenna sectors of the multiple antennas for transmission for the responder nodes according to the feedback.

All above mentioned various embodiments of the central network controller may be applied to the system accordingly.

Figure 11:
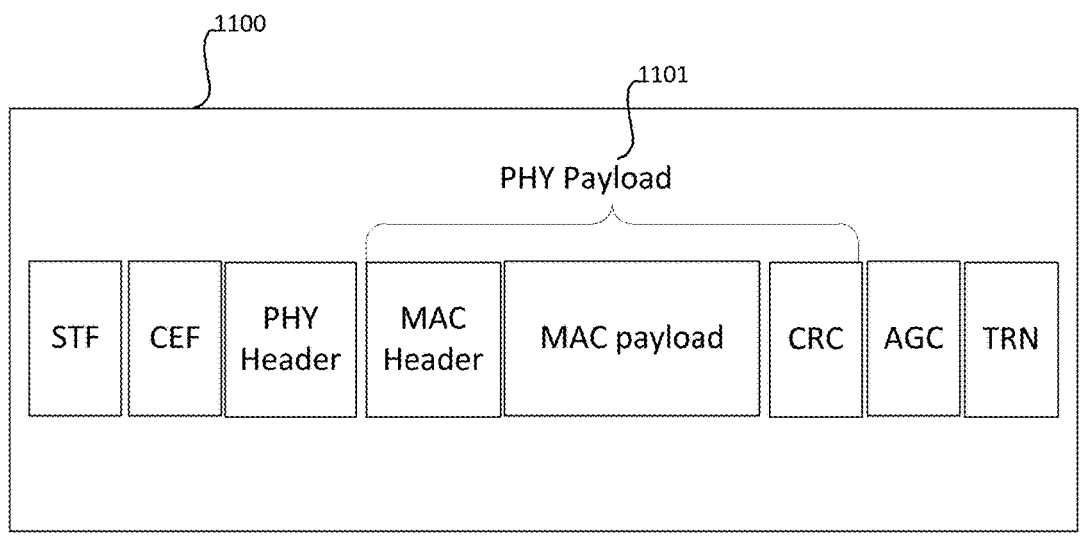
FIG. 11 shows an embodiment of a single packet structure 1100.

FIG. 11 shows an embodiment of a single packet structure 1100.

An embodiment reduces the overhead imposed in training devices in BRP phase if each device is trained separately using a separate single-user BRP packet; therefore, in an embodiment, a single BRP packet 1100 is used for training all devices and allowing devices to have a proper estimate of the channel impulse response by transmitting TRN fields from different antennas ports while silencing other non-transmitting antennas ports. The single packet structure may be used in any of above described embodiments to achieve the beamforming training process. The packet consists of elements such as a short training field (STF), A channel estimation field (CEF) that is also used for auto-detection of the PHY type. They are followed by the PHY header and PHY payload 1101, which is protected by a cyclic redundancy check (CRC). The PHY payload 1101 may further include a MAC header and MAC payload. Optional automatic gain control (AGC) and training (TRN) fields might be appended. The mapping of the TRN fields is performed in such a way that if the TRN field is transmitted from an antenna port, the other antenna ports are silenced.

Using the same BRP packet and after the PCP/AP has received the L-RX from the devices requesting the beam refinement during the BRP setup phase, the PCP/AP will append TRN-R fields and transmit these fields from different antennas to cover multiple devices. The TRN-R fields are transmitted from different antennas.

For the case of BRP-RX packets, the TRN-R fields corresponding to the same antenna ID is transmitted with the same AWV for the same antenna ID. Each antenna has its own AWV. For the case of BRP-TX packets, the TRN-T is transmitted with different AWVs for the same antenna IDs.

FIG. 12A illustrates an embodiment of an SSW frame format.

FIG. 12B illustrates an embodiment of a SSW feedback field corresponding to FIG. 12A.

An SSW frame format contains Frame control, Duration, SSW, SSW Feedback etc. A corresponding SSW feedback field includes sector select, DMG antenna select SNR report etc. When 2 bits for Antenna ID with its corresponding sector (Sector Select) to be fed-back in each SSW frame, the DMG Antenna Select subfield of the SSW Feedback field within the SSW frame identifies only one DMG antenna which was received with best quality in the immediately preceding sector sweep. In other words, an optimum antenna that is feedback which is favored by the responder. 4 or more bits for the Antenna ID may be allocated so that more Antenna IDs can be feedback as favorable transmission choice for the responder.

The following references are related to subject matter of the present application. Each of these references is incorporated herein by reference in its entirety:

[1] "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 3: Enhancements for Very High Throughput in the 60 GHz Band," IEEE Computer Society, Dec. 28, 2012.

The following acronyms are used herein:
AP Access Point
ACK Acknowledgement
AWV Antenna Weight Vector
BRP Beam Refinement Protocol
DMG Directional Multi-Gigabit
EDMG Enhanced Directional Multi-Gigabit
ID Identifier
IFS Inter-Frame Spacing
ISS Initiator Sector Sweep
MIMO Multiple-input and multiple-output
mmWave Millimeter-Wave
MU-MIMO Multiuser Multiple-Input and Multiple-Output
PBSS Personal Basic Service Set
PCP PBSS Control Point
SIFS Short Inter-Frame Spacing
SISO Single-Input and Single-Output
SLS Sector Level Sweep
SNR Signal-to-Noise-Ratio
SSW Sector Sweep
STA Station
SU-MIMO Single-User Multiple-Input and Multiple-Output
RF Radio Frequency
RSS Responder Sector Sweep
RXSS Receiver Sector Sweep
TRN Training
TXSS Transmit Sector Sweep While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for beamforming training, comprising:
signaling a plurality of signal-to-noise ratio (SNR) values with each of the SNR values associated with one of a plurality of antenna identifiers (IDs) in a first frame identifying different radio frequency (RF) chains for a process of beamforming training, the RF chains being connected to multiple physical antenna elements with multiple antenna sectors, wherein each of the multiple antenna sectors is identified with a sector ID;
receiving and transmitting the first frame bi-directionally between multiple pairs of communicating nodes, wherein each pair of the communicating nodes has at least one initiator node and one responder node;
receiving a feedback comprising the SNR values associated with the antenna IDs from two or more responder nodes of the multiple pairs of the communicating nodes to choose an RF chain as a transmit antenna for transmission;
determining respective one from the multiple antenna sectors of the multiple physical antenna elements for transmission for the responder nodes according to the feedback;
selecting a number of antennas as transmit antennas for the responder nodes;
signaling the first frame from the number of antennas respectively; and
transmitting the first frame a number of times equal to a maximum number of the selected transmit antennas.

2. The method of claim 1, further comprising:
keeping a receive state for each responder node until all responder nodes have performed the feedback.

3. The method of claim 1, wherein the antenna ID is encoded in a field of the first frame being allocated for the antenna sector and the field is encoded as more than 2 bits.

4. The method of claim 1, wherein the first frame is a sector sweep (SSW) frame, wherein the SSW frame further comprises a plurality of signal-to-interference-plus-noise ratio (SINR) values with each of the SINR values associated with one of the antenna IDs.

5. The method of claim 1, further comprising:
transmitting pairing frames to assign antennas with all the feedbacks having been received from the two or more responders.

6. The method of claim 1, further comprising:
transmitting a single beam refinement protocol (BRP) packet for the process of beamforming training from the multiple physical antenna elements to all responder nodes; and appending training fields with the BRP packet.

7. The method of claim 6, further comprising:
when the training fields being appended with the BRP packet; changing directions of an associated antenna of the multiple physical antenna elements sequentially so that the responder node in the pair detects different beams sent from the associated antenna.

8. The method of claim 6, further comprising:
transmitting the training fields from an antenna port while other antenna ports are silenced.

9. The method of claim 6, wherein the training fields appended to the BRP packet are silenced while other training fields are transmitted.

10. The method of claim 6, wherein the BRP packet from different antennas are transmitted with a delay.

11. The method of claim 1, further comprising:
pairing a first antenna with a first responder node according to the feedback from the first responder node, information gained from the first pairing is configured to be used for a second antenna with a second responder node; repeating the process of the first responder node and the second responder node for the next responder nodes.

12. The method of claim 1, further comprising:

assigning different antenna and antenna sector for each responder node with a multicast frame, wherein the multicast frame further comprises a descriptor set mapping the antenna sector to the responder node, wherein the descriptor set maps different training fields to different antennas for different communicating node.

13. The method of claim 1, further comprising:

transmitting a packet containing periods of no transmission from one or more antennas in a packet-based communication network.

14. A central network controller for beamforming training, comprising:

a non-transitory computer readable medium storing instructions; and a processor which upon execution of said instructions performs the following:

signaling a plurality of signal-to-noise ratio (SNR) values with each of the SNR values associated with one of a plurality of antenna identifiers (IDs) in a first frame identifying different radio frequency (RF) chains for a process of beamforming training, the RF chains being connected to multiple physical antenna elements with multiple antenna sectors, wherein each of the multiple antenna sectors is identified with a sector ID;

receiving and transmitting the first frame bi-directionally between multiple pairs of communicating nodes, wherein each pair of the communicating nodes has at least one initiator node and one responder node;

receiving a feedback of the SNR values associated with the antenna IDs from two or more responder nodes of the multiple pairs of the communicating nodes to choose an RF chain as a transmit antenna for transmission;

determining respective one from the multiple antenna sectors of the multiple physical antenna elements for transmission for the responder nodes according to the feedback;

selecting a number of antennas as transmit antennas for the responder nodes;

signaling the first frame from the number of antennas respectively; and transmitting the first frame a number of times equal to a maximum number of the selected transmit antennas.

15. The controller of claim 14, further comprising additional instructions that when executed by the processor perform the following:

keeping a receive state for each responder node until all responder nodes have performed the feedback.

16. The controller of claim 14, further comprising:

wherein the first frame is a sector sweep (SSW) frame, wherein the SSW frame further comprises a plurality of signal-to-interference-plus-noise ratio (SINR) values with each of the SINR values associated with one of the antenna IDs.

17. The controller of claim 14, further comprising additional instructions that when executed by the processor perform the following:

transmitting a single beam refinement protocol (BRP) packet for the process of beamforming training from the multiple physical antenna elements to all responder nodes; and appending training fields with the BRP packet.

* * * * *